Patented Jan. 16, 1934

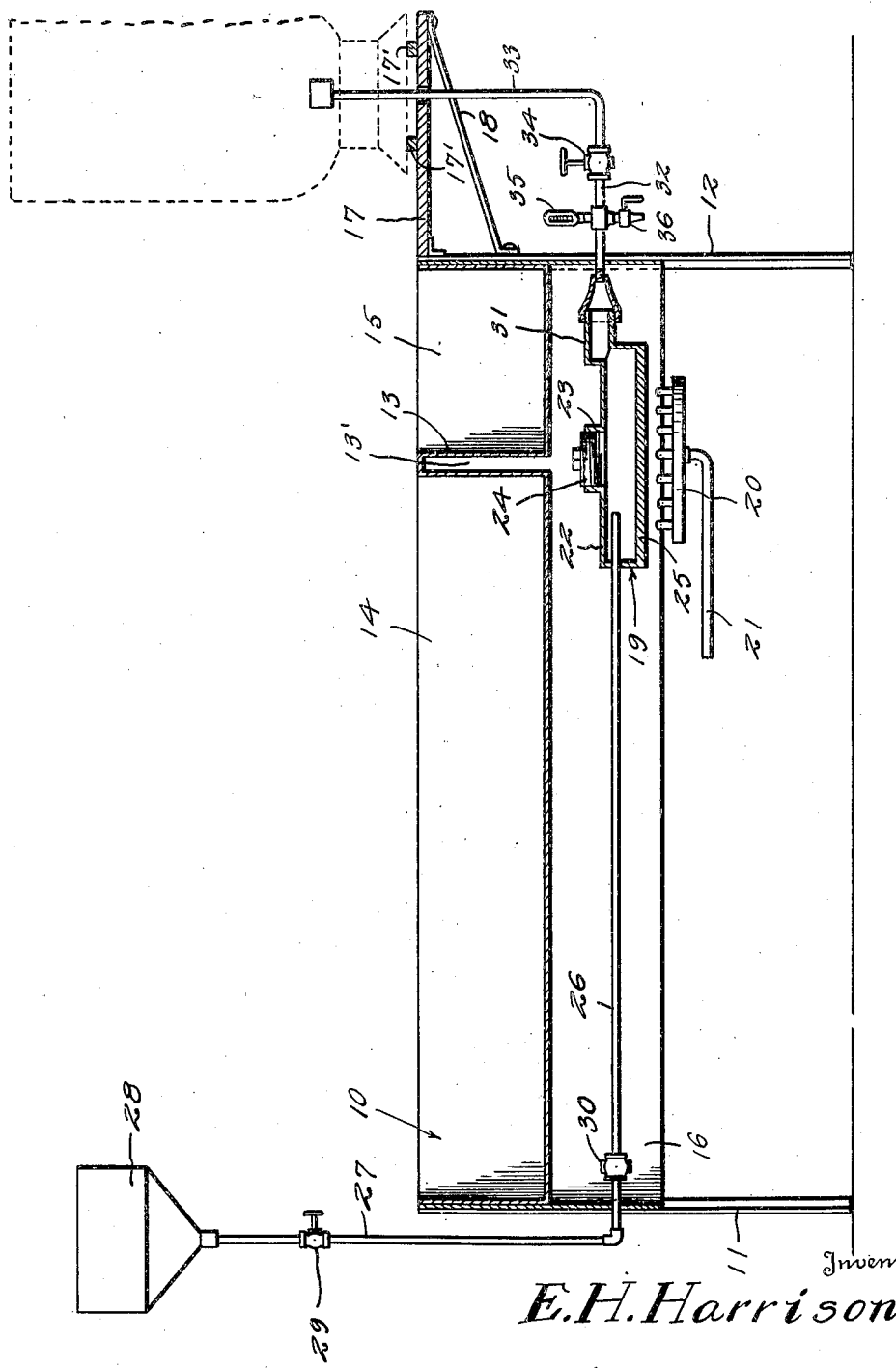

1,943,602

UNITED STATES PATENT OFFICE 1,943,602

STEAM VAT FOR CREAMERY USE

Everett H. Harrison, Wichita, Kans.

Application December 6, 1932. Serial No. 646,021

4 Claims. (Cl. 141—7)

This invention relates to can cleaning means, and more particularly to a cleaning means for the cleaning of milk cans or the like.

An object of this invention is to provide a tank which is adapted to receive water or other cleaning fluid and which is provided with a heating means disposed below the tank, the heating means including means for quickly generating steam which is discharged through a jet disposed at one end of the tank and over which a can is adapted to be inverted.

Another object of this invention is to provide in a device of this kind means for quickly generating steam through the use of a relatively small steam generator which is positioned closely adjacent the cleaning basin so that the heat from the generator will also heat the water in the basin.

A further object of this invention is to provide in a device of this kind means whereby cold water is discharged directly onto a hot plate for the generation of steam, the steam being dischargable through a discharge nozzle over which a can or other member to be cleaned is positioned.

The above and various other objects and advantages of this invention will in part be described and in part be understood from the following detailed description of the present preferred embodiment, the same being illustrated in the accompanying drawing wherein there is disclosed a vertical section taken substantially through the longitudinal center of a device constructed according to the preferred embodiment of this invention.

Referring to the drawing wherein like numerals of reference designate corresponding parts throughout the view, the numeral 10 designates generally a basin or tank which is supported by standards 11 and 12 positioned adjacent each end of the basin. This basin 10 is provided with a pair of dividing walls 13 so as to divide the interior of the basin 10 into a cleaning compartment 14 and a hot water compartment 15 with an air space 13' therebetween. Disposed along each side of the basin 10, there are positioned shields 16, which are adapted to retain the heat about the basin 10, as will be hereinafter described. This basin 10 is of a construction such that milk cans or the like may be placed in the cleaning compartment 14, which is adapted to receive a fluid such as water or the like, and the hot water compartment 15 is adapted to receive hot water which is of a temperature in excess of the temperature of the water in the cleaning compartment 14.

A table or platform 17 extends outwardly in a horizontal direction from the end standards 12, and is held in horizontal position by means of a bracket construction 18. A boiler or steam generator, generally designated as 19, is disposed below the basin 10, and this generator 19 has a burner 20 disposed therebeneath, which is connected by means of a pipe line 21 to a source of fuel supply. The heat from the burner 20 not only generates steam in the generator 19, but also heats the water in the hot water compartment 15 and also raises the temperature of the water in the cleaning basin or compartment 14. The greatest portion of the burner 20 is disposed beneath the clean water compartment 15, which is relatively short compared to the cleaning compartment 14 so that the temperature of the water in this compartment 15 will be in excess of the compartment 14.

The steam generator 19 comprises a casing 22 of desired configuration which, in the present instance, is substantially rectangular in side elevation and in top plan. The top wall of the casing 22 is provided with an extension 23 which is closed by a threaded closure 24 which serves as a means for gaining access to the interior of the casing 22 for cleaning or other purposes. The bottom wall 25 of the generator 19 is relatively thick so that the heat from the burner 20 will maintain this bottom 25 in a very hot condition, so that when water or the like is discharged into the casing 20 and onto the top of the plate 25 by means of a discharge pipe 26, this water will be immediately generated into steam. The pipe 26 is open at the inner end thereof and is connected by means of a second pipe 27 to a source of water supply, as a tank 28, which may be positioned in an elevated position above the basin 10 and of a desired capacity so that the desired pressure will be provided at the inner or open end of the discharge pipe 26.

A valve 29 is interposed in the pipe line 27 so as to control the quantity of fluid or water passing into the boiler 25. A check valve 30 is interposed in the pipe 26 outwardly of the boiler 25 and permits the free passage of water into the boiler, but prevents the return of the water to the tank when the steam pressure in the generator 19 exceeds the pressure of the water in the supply tank 28. A dome or outlet 31 is provided in the generator 19 oppositely from the discharge pipe 26, and this dome 31 is positioned at a point above the plate 25 so that only dry steam will pass out of the generator 19 and into a pipe line 32. This pipe line 32 has a spray nozzle 33 disposed in a vertical position and extending upwardly through the table 17.

A valve 34 is interposed in the pipe line 32 so that the quantity of steam discharging from the spray nozzle 33 can be manually controlled. A safety valve 35 of conventional construction is also interposed in the pipe line 32 and a drain valve 36 is operatively connected with the pipe line 32, so as to drain out any water or precipitate that might be in the pipe line 32.

The generator 19 in the present instance is supported beneath the tank 10 from the pipes 26 and 32 which extend through end walls of the shields 16, which shields are supported from the standards 11 and 12. However, other supporting means may be used for supporting the generator 19 where additional supporting means are necessary.

In the use and operation of this device, the burner 20 may be lighted and while the hot plate 25 is being heated, the first cans may be cleaned in the cleaning basin 14, which will also have the water therein heated by means of the burner 20 which underlies a portion of one end of this compartment. When it is desired to steam out the interior of the can so as to sterilize the can, the valve 29 may be opened, thereby permitting the water in the tank 28 to flow past the check valve 30 into the generator 25. Immediately the water strikes the hot plate 25, it will turn to steam and the pressure of the steam when it exceeds the pressure of the water entering the generator 19, will automatically close the check valve 30 and the steam will pass out of the generator 19 into the steam dome 31 and from thence into the pipe 32 and out through the discharge nozzle 33. By means of the shields or aprons 16, the rising from the burner 30 will be retained about the bottom surface of the basin 10 so that this heat will also tend to maintain the water in the two campartments 14 and 15 in the desired heated condition. Due to the close proximity of the clean water compartment 15 to the burner and the fact that a relatively large portion of the burner 20 underlies this compartment, the water in this compartment will be heated to a relatively hot condition which will be in excess of the water in the compartment 14, and this hot clean water can be used in the process of cleaning the cans.

It will be noted, from the foregoing, that an exceedingly simple portable can sterilizing means has been disclosed which can be used in locations where water is not obtainable in pipe lines, or where it is not advisable or desirable to generate steam from a relatively large boiler. This steam generator is relatively small in size so that it will be economical to use while at the same time being capable of generating sufficient steam at all times to sterilize and clean the cans. The can to be sterilized will rest on a pair of parallel bars 17' disposed one on each side of the spray nozzle 33 and secured to the drain board or table 17. In this manner, the steam or condensed liquid will flow out of the can.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. A can cleansing means comprising a steam generator, a burner below the generator, a cleansing basin supported above the generator for heating of a liquid therein coactive with the generation of steam in the generator, and means supported at one end of the basin and connected to the generator for cleansing the interior of a can, said basin comprising two compartments disposed in spaced relation to each other, the space between the two compartments being disposed above the generator and receiving heat therefrom to heat the confronting walls of the compartments.

2. A can cleansing means comprising a steam generator, a burner below the generator, a cleansing basin supported above the generator for heating of a liquid therein, shields about the basin for retaining the heat about the basin, a can supporting means disposed adjacent said basin, and a spray nozzle connected to the generator and extending upwardly through the can supporting means, said basin comprising two compartments disposed in spaced relation to each other, the space between the two compartments being disposed above the generator and receiving heat therefrom to heat the confronting walls of the compartments.

3. In a can cleansing means including a liquid holding basin, a steam generator, a spray nozzle connected to the generator, a burner below the generator, and means for supplying a liquid to the generator, said basin comprising two compartments disposed in spaced relation to each other, the space between the two compartments being disposed above the generator and receiving heat therefrom to heat the confronting walls of the compartments.

4. In a can cleansing means including a basin to support a liquid, a steam generator below the basin, means for heating the generator, a steam spray nozzle, means connecting the nozzle with the generator, a pipe connecting the generator with a source of fluid supply, and a check valve in the pipe to prevent back pressure within the pipe, said basin comprising two compartments disposed in spaced relation to each other, the space between the two compartments being disposed above the generator and receiving heat therefrom to heat the confronting walls of the compartments.

EVERETT H. HARRISON.